United States Patent
Howard et al.

(10) Patent No.: US 11,708,482 B2
(45) Date of Patent: Jul. 25, 2023

(54) RUBBER ARTICLES WITH IMPROVED FIRE PROPERTIES

(71) Applicant: Bridgestone Americas Tire Operations, LLC, Nashville, TN (US)

(72) Inventors: Michael C. Howard, Noblesville, IN (US); Brandon C. Adcock, Nashville, TN (US); Hang Li, Copley, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 60 days.

(21) Appl. No.: 16/646,919

(22) PCT Filed: Sep. 18, 2018

(86) PCT No.: PCT/US2018/051457
§ 371 (c)(1),
(2) Date: Mar. 12, 2020

(87) PCT Pub. No.: WO2018/051457
PCT Pub. Date: Sep. 18, 2018

(65) Prior Publication Data
US 2020/0270431 A1    Aug. 27, 2020

Related U.S. Application Data

(60) Provisional application No. 62/559,948, filed on Sep. 18, 2017.

(51) Int. Cl.
*C08L 11/00* (2006.01)
*B60C 1/00* (2006.01)

(52) U.S. Cl.
CPC ............... *C08L 11/00* (2013.01); *B60C 1/00* (2013.01); *C08L 2205/03* (2013.01)

(58) Field of Classification Search
CPC .. C08L 11/00; B60C 1/00; C08K 3/04; C08K 3/042; C08K 5/02
See application file for complete search history.

(56) References Cited

U.S. PATENT DOCUMENTS

| | | | |
|---|---|---|---|
| 6,927,250 B2 * | 8/2005 | Kaschak | ................... C08K 3/04 524/495 |
| 9,266,541 B2 | 2/2016 | Van Der Mee et al. | |
| 9,309,372 B2 | 4/2016 | Pan et al. | |
| 9,663,629 B2 | 5/2017 | Pan et al. | |
| 10,352,388 B2 | 7/2019 | Zander et al. | |
| 11,111,979 B2 * | 9/2021 | Howard | ..................... C08L 7/00 |
| 2004/0063859 A1 * | 4/2004 | Waddell | ................ B60C 1/0025 525/192 |
| 2004/0248485 A1 | 12/2004 | Kerstetter, III | |
| 2006/0125146 A1 | 6/2006 | Sandstrom | |
| 2006/0229404 A1 | 10/2006 | Lechtenboehmer | |
| 2007/0009723 A1 | 1/2007 | Ogawa et al. | |
| 2008/0111288 A1 | 5/2008 | Howard et al. | |
| 2009/0170991 A1 | 7/2009 | Lechtenboehmer | |
| 2010/0036023 A1 * | 2/2010 | Weng | ..................... B60C 1/0008 977/734 |
| 2010/0183856 A1 | 7/2010 | Kind | |
| 2011/0210486 A1 | 9/2011 | Agarwal et al. | |
| 2013/0231426 A1 | 9/2013 | Chen et al. | |
| 2014/0013693 A1 | 1/2014 | Zhou et al. | |
| 2014/0217656 A1 | 8/2014 | Agarwal | |
| 2014/0333016 A1 | 11/2014 | Howard et al. | |
| 2015/0004402 A1 * | 1/2015 | Tarkin-Tas | .............. C09D 5/185 428/339 |
| 2015/0167771 A1 | 6/2015 | Agarwal et al. | |
| 2015/0203693 A1 | 7/2015 | Mestan | |
| 2016/0153513 A1 | 6/2016 | Nieten | |
| 2016/0200900 A1 | 7/2016 | Chen et al. | |
| 2016/0347033 A1 | 12/2016 | Zhou et al. | |
| 2017/0114854 A1 | 4/2017 | Howard et al. | |
| 2017/0298201 A1 | 10/2017 | Zhou et al. | |

FOREIGN PATENT DOCUMENTS

| | | |
|---|---|---|
| CN | 103 707 579 A | 4/2014 |
| EP | 1 484 525 A2 | 12/2004 |
| WO | 2017-091319 A1 | 6/2017 |

OTHER PUBLICATIONS

International Search Report and Written Opinion for corresponding PCT/US2018/051457 dated Jan. 14, 2019.

* cited by examiner

*Primary Examiner* — Angela C Scott
(74) *Attorney, Agent, or Firm* — Meredith E. Hooker; Arthur M. Reginelli

(57) ABSTRACT

Tires and tire components are provided having improved fire properties, as well as the vulcanizable compositions for making the tires and tire components. A vulcanizable composition is provided that includes at least one vulcanizable polymer, a curative, a halogenated hydrocarbon, and expandable graphite. The tires and tire components have improved properties including one or more of improved flame retardancy, reduced smoke density and/or toxicity, and reduced heat release.

21 Claims, No Drawings

RUBBER ARTICLES WITH IMPROVED FIRE PROPERTIES

This application is a National-Stage application of PCT/US2018/051457 filed on Sep. 18, 2018, which claims the benefit of U.S. Provisional Application Ser. No. 62/559,948 filed on Sep. 18, 2017, which are incorporated herein by reference.

FIELD OF THE INVENTION

Embodiments of the present invention are directed toward rubber articles, as well as the vulcanizable compositions for making these rubber articles, having improved fire properties.

BACKGROUND OF THE INVENTION

Rubber articles are commonly employed in many different industries. To name just a few, mention may be made of tires, air springs, hoses, conveyer belts, roofing materials, and other construction membranes. Rubber hoses, for example, are in wide use for material transfer and fluid power applications.

Fire resistance standards for rubber articles have become increasingly stringent. Some of the most stringent standards apply to articles used on railway passenger trains, in particular trains that travel substantially through tunnels.

Standards for flame retardancy properties such as flame spread, heat release, and smoke generation upon burning have become increasingly stringent for articles used in mass transportation such as trains. The European Union provides a fire standard for rail applications, namely EN-45545. This standard imposes stringent requirements on heat release, smoke density, and toxicity and flame spread properties allowed for materials used in these applications. Smoke density (Ds-4) in EN-45545 is the smoke density after four minutes measured according to ISO 5659-2, and heat release in EN-45545 is the maximum average rate of heat emission (MAHRE) measured according to ISO5660-1 and flame spread in EN-45545 is the critical heat flux at extinguishment (CFE) measured according to ISO 5658-2.

Hazard Levels (HL1 to HL3) have been designated, reflecting the degree of probability of personal injury as the result of a fire. The levels are based on dwell time and are related to operation and design categories. HL1 is the lowest hazard level and is typically applicable to vehicles that run under relatively safe conditions (easy evacuation of the vehicle). HL3 is the highest hazard level and represents most dangerous operation/design categories (difficult and/or time-consuming evacuation of the vehicle, e.g. in underground rail cars). For each application type, different test requirements for the hazard levels are defined. Some of the requirements of these fire resistance standards are that the materials generate very low smoke density during burning, be self-extinguishing when on fire, have very high limiting oxygen index (LOI), have very high flammability temperature, only emit gasses with very low toxicity, be halogen-free and heavy-metal free, and be electrically isolating.

At the same time, hoses and other rubber articles must comply with various conventional design requirements. Performance criteria include such factors as burst pressure, cold flexibility, oil resistance, hot air resistance, ozone resistance, and structural integrity of various adhered layers. It is generally believed in the art that the more fire retarding additives one mixes into the rubber in an attempt to meet fire standards, the worse the physical properties become.

U.S. Patent App. Publ. No. 2006/0100328 A1 reports that, although various textbooks and handbooks discuss the wide array of fire retardants available for a wide array of plastic and elastomer applications (citing, e.g., R. G. Gann et al., "Flammability," in H. F. Mark et al., eds., Encyclopedia of Polymer Science and Engineering, v. 7, pp. 154-210, (2d ed. 1987)), it is clear that combinations are rarely synergistic. Combining ingredients often leads only to minor additive effects, or even antagonistic effects.

It is particularly challenging to manufacture articles that meet fire protection standards and have good mechanical properties and processability. There remains a need in the market for rubber compositions with improved fire resistance and sufficient physical performance properties to meet the stringent standards that have been put into place, particularly for transportation and construction applications.

SUMMARY OF THE INVENTION

One or more embodiments of the present invention provide a tire component that may be prepared by a process comprising the steps of (i) preparing a vulcanizable composition that includes at least one vulcanizable polymer, a curative, at least one halogenated hydrocarbon wax, and expandable graphite; (ii) fabricating an uncured tire component comprising at least one layer that is formed from said vulcanizable composition; and (iii) at least partially curing the uncured tire component.

One or more embodiments of the present invention further provide a tire comprising the vulcanizate of a vulcanizable composition that includes a rubber that includes at least one vulcanizable polymer, a curative, a halogenated hydrocarbon wax, and expandable graphite.

One or more embodiments of the present invention further provide a method for preparing a tire component, the method comprising the steps of (i) preparing a vulcanizable composition that includes at least one vulcanizable polymer, a curative, at least one halogenated hydrocarbon wax, and expandable graphite; (ii) fabricating an uncured tire component comprising at least one layer that is formed from said vulcanizable composition; and (iii) at least partially curing the uncured tire component.

DETAILED DESCRIPTION OF ILLUSTRATIVE EMBODIMENTS

Embodiments of the present invention are based upon the discovery of rubber articles that have improved fire properties including one or more of reduced smoke density, smoke toxicity, and heat release when subjected to a fire event. The rubber articles include expandable graphite and a halogenated hydrocarbon wax dispersed within a rubber matrix. It is believed that the halogenated hydrocarbon wax and the expandable graphite provide a synergistic blend that provides the advantageous properties that have been observed.

I. VULCANIZABLE COMPOSITION

In one or more embodiments, the cured rubber article is formed from a vulcanizable composition that includes at least one elastomer, a curative, a halogenated hydrocarbon wax, expandable graphite, optionally a flame retardant, and optionally an inorganic filler. The vulcanizable composition may also include those ingredients that are conventional in rubber compositions such as, but not limited to, organic fillers, plasticizers, antidegradants, including antioxidants and antiozonants, fillers, oils, tackifiers, reinforcing resins, fatty acids such as stearic acid, adhesive aids, scorch retarders, softeners, peptizers, accelerators, accelerator activators, processing aids, homogenizing agents, release agents, zinc oxide, and other additives that are conventionally employed in rubber compositions.

A. Elastomer

In one or more embodiments, the elastomer includes those polymers that are capable of being cured (also referred to as vulcanized) to form elastomeric compositions of matter. Elastomers that may be used include natural and synthetic rubbers. The synthetic rubbers typically derive from the polymerization of conjugated diene monomer, the copolymerization of conjugated diene monomer with other monomer such as vinyl-substituted aromatic monomer, or the copolymerization of ethylene with one or more $\alpha$-olefins and optionally one or more diene monomers.

Exemplary polymers include natural rubber, synthetic polyisoprene, polybutadiene, polyisobutylene-co-isoprene, polychloroprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, nitrile rubber, silicone rubber, epichlorohydrin rubber, and mixtures thereof. These elastomers can have a myriad of macromolecular structures including linear, branched, and star-shaped structures. These elastomers may also include one or more functional units, which typically include heteroatoms.

In one or more embodiments, the vulcanizable composition comprises unsaturated chlorinated polymer. Examples of unsaturated chlorinated polymer include polymers that derive from the polymerization of halogenated dienes and optionally monomer copolymerizable therewith. A popular halogenated diene is 2-chloro-1,3-butadiene, which is also known as chloroprene. Monomer copolymerizable with chloroprene includes sulfur and 2,3-dichloro-1,3-butadiene. Homopolymers of chloroprene are generally referred to as polychloroprene. For purposes of this description, the polymers deriving from the copolymerization of chloroprene and monomer copolymerizable therewith may be referred to as polychloroprene copolymers. Examples of polychloroprene or polychloroprene copolymers are available from DuPont Performance Elastomers (Wilmington, Del.) under the Neoprene™ "W" type family designations.

In one or more embodiments, where the rubber article is a hose, the rubber component includes at least one of chloroprene rubber, butadiene rubber, styrene-butadiene rubber, natural rubber, chlorosulfonated polyethylene, chlorinated polyethylene, nitrile rubber, hydrogenated acrylonitrile-butadiene rubber, acrylic rubber, ethylene-propylene rubber (EPDM), epichlorohydrin rubber, hydrin rubber, silicone rubber, and fluororubber. In one or more embodiments, two or more of these may be used in combination.

B. Halogenated Hydrocarbon

In one or more embodiments, the elastomeric compositions include at least one halogenated hydrocarbon wax. Halogenated hydrocarbon flame retardants are generally described in U.S. Pat. No. 4,579,906 and U.S. Patent App. Pub. No. 2004/0138351 A1, both of which are incorporated herein by reference.

In one or more embodiments, the halogenated hydrocarbon wax may be characterized by a molecular weight of at least 50 g/mol, in other embodiments, at least 100 g/mol, in other embodiments, at least 150 g/mol, in other embodiments, at least 200 g/mol, and in other embodiments, at least 250 g/mol. In one or more embodiments, the halogenated hydrocarbon wax may be characterized by a molecular weight of at most 10,000 g/mol, in other embodiments, at most 9,000 g/mol, in other embodiments, at most 8,000 g/mol, in other embodiments, at most 7,000 g/mol, and in other embodiments, at most 6,000 g/mol, in other embodiments, at most 5,000 g/mol, in other embodiments, at most 4,000 g/mol, in other embodiments, at most 3,000 g/mol, in other embodiments, at most 2,000 g/mol, and in other embodiments, at most 1,000 g/mol. Molecular weight may be determined by conventional methods, including gel permeation chromatography.

In one or more embodiments, the halogenated hydrocarbon wax may be characterized by a softening point of from about 40 to about 150° C., in other embodiments, from about 50 to about 130° C., and in other embodiments, from about 60 to about 125° C., when measured according to ASTM D-36.

In one or more embodiments, the elastomeric compositions include at least one chlorinated hydrocarbon wax. Examples of chlorinated hydrocarbon waxes include hydrocarbon waxes having at least one chlorocarbon segment, e.g., a hydrocarbon segment in which some or all hydrogens have been replaced with chlorine atoms along the carbon chain. In certain embodiments, the chlorinated hydrocarbon wax is a chlorinated paraffin wax. Chlorinated hydrocarbon waxes that are suitable for use in the rubber compositions disclosed herein include Chlorez chlorinated waxes (available from Dover Chemical Corporation, Dover, Ohio) such as Chlorez 700, Chlorez 700-S, Chlorez 760, Chlorez 700-DD, Chlorez 700-SS, and Chlorez 700-SSNP; Chlorofio 40 (available from Dover Chemical Corporation, Dover, Ohio), Paroil chlorinated oils (available from Dover Chemical Corporation, Dover, Ohio) such as Paroil 150-LV, Paroil 10-NR and Paroil 63-NR).

Suitable chlorinated hydrocarbon waxes used in the rubber compositions disclosed herein include from 30-75% by weight chlorine based on the total weight of the wax, preferably from 40 to 75% by weight chlorine. Chlorinated hydrocarbon waxes are further described in U.S. Patent App. Publ. No. 2016/0200900 A1, which is incorporated by reference herein.

C. Expandable Graphite

Expandable graphite may also be referred to as expandable flake graphite, intumescent flake graphite, or expandable flake; and, for the purposes herein, these terms may be used interchangeably. Expandable graphite is so-named because, when heated to or above a certain temperature, often referred to as the onset temperature, the expandable graphite particles are expanded perpendicularly to the layer plane.

In one or more embodiments, the expandable graphite includes intercalated graphite, in which an intercallant material is included between the graphite layers of graphite crystals or particles. In these or other embodiments, when the expandable graphite is exposed to elevated temperatures that are at or above the onset temperature, the intercalant compound changes form, for example from liquid or solid to gas. This rapid reaction creates a force that is capable of separating the graphite layers, and may result in a significant increase in volume. This expansion is sometimes referred to as exfoliation. In one or more embodiments, the expansion volume and the onset temperature may be controlled by selecting the intercalant and adjusting parameters within the intercalation process.

Examples of intercallant materials include halogens, alkali metals, sulfates, nitrates, various organic acids, aluminum chlorides, ferric chlorides, other metal halides, arsenic sulfides, and thallium sulfides. In certain embodiments of the present invention, the expandable graphite includes non-halogenated intercallant materials. In certain embodiments, the expandable graphite includes sulfate intercallants, also referred to as graphite bisulfate. As is known in the art, bisulfate intercalation is achieved by treating highly crystalline natural flake graphite with a mixture of sulfuric acid and other oxidizing agents which act to catalyze the sulfate intercalation.

Commercially available examples of expandable graphite include HPMS Expandable Graphite (HP Materials Solutions, Inc., Woodland Hills, Calif.) and Expandable Graphite Grades 1721 (Asbury Carbons, Asbury, N.J.). Other commercial grades contemplated as useful in the present invention include 1722, 3393, 3577, 3626, and 1722HT (Asbury Carbons, Asbury, N.J.).

In one or more embodiments, the expandable graphite may be characterized as having a mean or average size in the range from about 30 µm to about 1.5 mm, in other embodiments from about 50 µm to about 1.0 mm, and in other embodiments from about 180 µm to about 850 µm. In certain embodiments, the expandable graphite may be characterized as having a mean or average size of at least 30 µm, in other embodiments at least 44 µm, in other embodiments at least 180 µm, and in other embodiments at least 300 µm. In one or more embodiments, expandable graphite may be characterized as having a mean or average size of at most 1.5 mm, in other embodiments at most 1.0 mm, in other embodiments at most 850 µm, in other embodiments at most 600 µm, in yet other embodiments at most 500 µm, and in still other embodiments at most 400 µm. Useful expandable graphite includes Graphite Grade #1721 (Asbury Carbons), which has a nominal size of greater than 300 µm.

In one or more embodiments, the expandable graphite may be characterized as having a median size in the range from about 30 µm to about 1.5 mm, in other embodiments from about 50 µm to about 1.0 mm, and in other embodiments from about 180 µm to about 850 µm. In certain embodiments, the expandable graphite may be characterized as having a median size of at least 30 µm, in other embodiments at least 44 µm, in other embodiments at least 180 µm, and in other embodiments at least 300 µm. In one or more embodiments, expandable graphite may be characterized as having a median size of at most 1.5 mm, in other embodiments at most 1.0 mm, in other embodiments at most 850 µm, in other embodiments at most 600 µm, in yet other embodiments at most 500 µm, and in still other embodiments at most 400 µm. Useful expandable graphite includes Graphite Grade #1721 (Asbury Carbons), which has a nominal size of greater than 300 µm.

In one or more embodiments of the present invention, the expandable graphite may be characterized as having a nominal particle size of 20×50 (US sieve). US sieve 20 has an opening equivalent to 0.841 mm and US sieve 50 has an opening equivalent to 0.297 mm. Therefore, a nominal particle size of 20×50 indicates the graphite particles are at least 0.297 mm and at most 0.841 mm.

In one or more embodiments, the expandable graphite may be characterized as having a carbon content in the range from about 70% to about 99%. In certain embodiments, the expandable graphite may be characterized as having a carbon content of at least 80%, in other embodiments at least 85%, in other embodiments at least 90%, in yet other embodiments at least 95%, in other embodiments at least 98%, and in still other embodiments at least 99% carbon.

In one or more embodiments, the expandable graphite may be characterized as having a sulfur content in the range from about 0% to about 8%, in other embodiments from about 2.6% to about 5.0%, and in other embodiments from about 3.0% to about 3.5%. In certain embodiments, the expandable graphite may be characterized as having a sulfur content of at least 0%, in other embodiments at least 2.6%, in other embodiments at least 2.9%, in other embodiments at least 3.2%, and in other embodiments 3.5%. In certain embodiments, the expandable graphite may be characterized as having a sulfur content of at most 8%, in other embodiments at most 5%, in other embodiments at most 3.5%.

The change in volume of the graphite may be expressed as a ratio, and is sometimes referred to as the expansion ratio. In one or more embodiments, the expansion ratio may be expressed as the final volume, in cubic centimeters (cc), of one gram (g) of exfoliated expandable graphite. In one or more embodiments, the expandable graphite may be characterized as having an expansion ratio (cc/g) in the range from about 10:1 to about 500:1, in other embodiments at least 20:1 to about 450:1, in other embodiments at least 30:1 to about 400:1, in other embodiments from about 50:1 to about 350:1.

In certain embodiments, the expandable graphite may be characterized as having an expansion ratio (cc/g) of at least 10:1, in other embodiments at least 20:1, in other embodiments at least 30:1, in other embodiments at least 40:1, in other embodiments at least 50:1, in other embodiments at least 60:1, in other embodiments at least 90:1, in other embodiments at least 160:1, in other embodiments at least 210:1, in other embodiments at least 220:1, in other embodiments at least 230:1, in other embodiments at least 270:1, in other embodiments at least 290:1, and in yet other embodiments at least 300:1.

In certain embodiments, the expandable graphite may be characterized as having an expansion ratio (cc/g) of at most 350:1, and in yet other embodiments at most 300:1.

In one or more embodiments, the expandable graphite, as it exists within the pouch or binder component of the indicator of the present invention, is partially expanded. In one or more embodiments, the expandable graphite is not expanded, however, to a deleterious degree, which includes that amount or more of expansion that will deleteriously affect the ability to form the indicator product and the ability of the graphite to exhibit a visual change upon exposure to a critical temperature. In one or more embodiments, the expandable graphite is expanded to at most 100%, in other embodiments at most 50%, in other embodiments at most 40%, in other embodiments at most 30%, in other embodiments at most 20%, and in other embodiments at most 10% beyond its original unexpanded size.

In one or more embodiments, the expandable graphite may be characterized as having a pH in the range from about 1 to about 10; in other embodiments from about 1 to about 6; and in yet other embodiments from about 5 to about 10. In certain embodiments, the expandable graphite may be characterized as having a pH in the range from about 4 to about 7. In one or more embodiments, the expandable graphite may be characterized as having a pH of at least 1, in other embodiments at least 4, and in other embodiments at least 5. In certain embodiments, the expandable graphite may be characterized as having a pH of at most 10, in other embodiments at most 7, and in other embodiments at most 6.

Onset temperature, i.e. the temperature at which exfoliation of the graphite begins, may also be interchangeably referred to as expansion temperature. In one or more embodiments, the expandable graphite may be characterized by an onset temperature, ranging from about 100° C. to about 280° C.; in other embodiments from about 150° C. to about 260° C.; in other embodiments from about 170° C. to about 250° C.; and in other embodiments from about 160° C. to about 225° C.

In one or more embodiments, the expandable graphite may be characterized by an onset temperature of at least 100° C., in other embodiments at least 130° C., in other embodiments at least 150° C., in other embodiments at least 160° C., in other embodiments at least 170° C., and in other embodiments at least 180° C. In one or more embodiments, the expandable graphite may be characterized by an onset temperature of at least 190° C., in other embodiments at least 200° C., in other embodiments at least 210° C., and in other embodiments at least 220° C. In one or more embodiments, the expandable graphite may be characterized by an onset temperature of at most 280° C., in other embodiments at most 260° C., in other embodiments at most 250° C., and in other embodiments at most 225° C. In one or more embodiments, the onset temperature may be defined as the temperature below which there is only up to 5% volume change in the expandable graphite.

D. Curative

A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, ($3^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, ($2^{nd}$ Ed. 1989), which are incorporated herein by reference. In one or more embodiments, the curative is sulfur. Examples of suitable sulfur vulcanizing agents include "rubbermaker's" soluble sulfur; sulfur donating vulcanizing agents, such as an amine disulfide, polymeric polysulfide or sulfur olefin adducts; and insoluble polymeric sulfur. Vulcanizing agents may be used alone or in combination. The skilled person will be able to readily select the amount of vulcanizing agents to achieve the level of desired cure.

In one or more embodiments, the curative is employed in combination with a cure accelerator. In one or more embodiments, accelerators are used to control the time and/or temperature required for vulcanization and to improve properties of the vulcanizate. Examples of accelerators include thiazol vulcanization accelerators, such as 2-mercaptobenzothiazol, dibenzothiazyl disulfide, N-cyclohexyl-2-benzothiazyl-sulfenamide (CBS), and the like, and guanidine vulcanization accelerators, such as diphenylguanidine (DPG) and the like. The skilled person will be able to readily select the amount of cure accelerators to achieve the level of desired cure.

In one or more embodiments, the curative package may also include one or more of zinc oxide, stearic acid, and magnesium oxide (MgO).

E. Flame Retardants

The vulcanizable compositions may include a flame retardant in addition to the expandable graphite and halogenated hydrocarbon wax. These additional flame retardants may be referred to as complementary flame retardants and may generally include any compound that increases one or more fire performance properties. In one or more embodiments, the complementary flame retardants include those that operate by forming a char-layer across the surface of a specimen when exposed to a flame. Other useful flame retardants include those that operate by releasing water upon thermal decomposition of the flame retardant compound. Useful flame retardants may also be categorized as halogenated flame retardants or non-halogenated flame retardants.

In one or more embodiments, the complementary flame retardant may include alumina trihydrate (ATH), which may also be referred to as hydrated alumina, aluminum hydroxide, or aluminum trihydroxide. In one or more embodiments, the alumina trihydrate may be characterized by a median particle size of from about 1 micron to about 80 microns, in other embodiments, from about 5 to about 15 microns. Alumina trihydrate is commercially available, for example from Huber Engineered Materials, and from the R.J. Marshall Company.

Exemplary non-halogenated flame retardants also include magnesium hydroxide, zinc borate, ammonium polyphosphate, melamine polyphosphate, antimony oxide (Sb2O3), calcium borate, basic magnesium carbonate, gypsum, and mixtures thereof.

F. Filler

In one or more embodiments, the vulcanizable composition may include at least one filler such as inorganic and organic fillers. Examples of organic fillers include carbon black, coal filler, ground recycled rubber, and starch. Examples of inorganic fillers include silica, aluminum hydroxide, magnesium hydroxide, mica, talc (hydrated magnesium silicate), and clays (hydrated aluminum silicates). In certain embodiments, a mixture of different fillers may be advantageously employed.

In one or more embodiments, carbon blacks include furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks. In one or more embodiments, the vulcanizable composition of this invention may include one or more reinforcing fillers and/or one or more non-reinforcing fillers.

Examples of suitable silica fillers include precipitated amorphous silica, wet silica (hydrated silicic acid), dry silica (anhydrous silicic acid), fumed silica, calcium silicate, aluminum silicate, magnesium silicate, and the like.

In one or more embodiments, silicas may be characterized by their surface areas, which give a measure of their reinforcing character. The Brunauer, Emmet and Teller ("BET") method (described in *J. Am. Chem. Soc.*, vol. 60, p. 309 et seq.) is a recognized method for determining the surface area. The BET surface area of silica is generally less than 450 $m^2/g$. Useful ranges of surface area include from about 32 to about 400 $m^2/g$, about 100 to about 250 $m^2/g$, and about 150 to about 220 $m^2/g$.

Where one or more silicas is employed, the pH's of the silicas are generally from about 5 to about 7 or slightly over 7, or in other embodiments from about 5.5 to about 6.8.

In one or more embodiments, the rubber composition may include clay. Useful clays include hydrated aluminum silicates. In one or more embodiments, useful clays can be represented by the formula $Al_2O_3SiO_2 \cdot XH_2O$. Exemplary forms of clay include kaolinite, montmorillonite, atapulgite, illite, bentonite, halloysite, and mixtures thereof. In one embodiment, the clay is represented by the formula $Al_2O_3SiO_2 \cdot 3H_2O$. In another embodiment, the clay is represented by the formula $Al_2O_3SiO_2 \cdot 2H_2O$. In a preferred embodiment, the clay has a pH of about 7.0.

In one or more embodiments, various forms or grades of clays may be employed. Exemplary forms or grades of clay include air-floated clays, water-washed clays, calcined clays, and chemically modified (surface treated) clays. In other embodiments, untreated clays may be used.

Air-floated clays include hard and soft clays. In one or more embodiments, hard clays include those characterized as having a lower median particle size distribution, and higher surface area than soft clays. In one or more embodiments, soft clays include those characterized by having a higher median particle size distribution and lower surface area than hard clays. Hard and soft clays are disclosed in U.S. Pat. Nos. 5,468,550, and 5,854,327, which are incorporated herein by reference.

In one embodiment, the air-floated clays used have a pH of from about 4.0 to about 8.0, and in another embodiment, the pH is about neutral. Useful airfloated clays have an average particle size of less than about 2 microns. Typical airfloated clays have a specific gravity of around 2.6 g/cc. Airfloated clays, both hard and soft, are available through various sources.

Water washed clays include those clays that are more closely controlled for particle size by the water fractionation process. This process permits the production of clays within controlled particle size ranges. In one or more embodiments, the average particle size of the clay is less than about 2 microns in diameter. In one embodiment, the water washed kaolin clay includes hydrated aluminum silicate, and may be characterized by a pH of from about 6 to about 7.5, and a specific gravity of about 2.6 g/cc.

Calcined clays include those that result from the removal of water contained in clays (clays typically contain about 14 percent water) by calcination.

Where an inorganic filler is employed, such as silica, the inorganic filler may be used in conjunction with a coupling agent, such as a mercapto silane, to enhance interaction between the inorganic particles and the rubber, or to create a chemical bond between the inorganic particles and the rubber. In these or other embodiments, the inorganic filler may be pre-functionalized to provide similar interaction or reaction. Useful coupling agents are disclosed in U.S. Pat. Nos. 3,842,111, 3,873,489, 3,978,103, 3,997,581, 4,002, 594, 5,580,919, 5,583,245, 5,663,396, 5,674,932, 5,684,171, 5,684,172, 5,696,197, 6,579,909, 6,590,017, 6,525,118, 6,342,552, 6,608,145, 6,667,362, and 6,683,135, the disclosures of which are incorporated herein by reference. Examples of sulfur-containing coupling agents include bis(trialkoxysilylorgano)polysulfides or mercapto-organoalkoxysilanes. Types of bis(trialkoxysilylorgano) polysulfides include bis(trialkoxysilylorgano)disulfide and bis (trialkoxysilylorgano)tetrasulfides.

G. Other Ingredients

Other ingredients that may be included in the vulcanizable formulation include additional elastomers, additional flame retardants, plasticizers, antidegradants, including antioxidants and antiozonants, fillers, oils, tackifiers, reinforcing resins, fatty acids such as stearic acid, adhesive aids, scorch retarders, softeners, peptizers, accelerators, accelerator activators, processing aids, homogenizing agents, release agents, zinc oxide, curatives, and other additives that are conventionally employed in rubber compositions.

In one or more embodiments, the vulcanizable composition of this invention may include an antioxidant. Useful antioxidants include bisphenol type antioxidants, diphenylamines, and zinc salts. Useful diphenylamine antioxidants are available under the tradename 405 (Akrochem). Useful zinc salt antioxidants are available under the tradename 58 (Akrochem).

Antidegradants protect the final product vulcanizate against damaging external influences such as oxidation, ozone, heat, and dynamic stresses. A suitable antidegradant is Wingstay 100, which is a mixed diaryl-p-phenylene type antidegradant. Another suitable antidegradant is Wingstay 29, which is a mixed para oriented styrenated diphenylamine. Wingstay 100 and Wingstay 29 are commercially available.

Another suitable antidegradant is IPPD, or N-isopropyl-N'-phenyl-p-phenylenediamine. IPPD is available through Flexsys (Akron, Ohio) under the tradename Santoflex IPPD.

Another suitable antidegradant is 6PPD, or N-(1,3-dimethylbutyl)-N-phenyl-p-phenylenediamine. 6PPD is available through Flexsys (Akron, Ohio) under the tradename Santoflex 6PPD.

Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils. In one or more embodiments, the vulcanizable composition of this invention may include low oil swell factices, or vulcanized oils. In specific embodiments, these compounds include sulfur vulcanized vegetable oils. These factices decrease compound nerve and may permit higher liquid plasticizer levels. Factices may also speed the incorporation of fillers and increase milling efficiency. A suitable factice is commercially available from Akrochem Corporation (Akron, Ohio) under the Akrofax tradename.

In one or more embodiments, plasticizers, which may also be referred to as softeners, include, but are not limited to, fatty acids, vegetable oils, petroleum products, coal tar products, pine products, esters, and resins. In particular embodiments, the plasticizers include esters such as dicapryilphthalate, butylcuminate, dibutylphthalate, butyllactate, glycerol chlorobenzoate, methylricinoleate, octyloleate, dioctylphthalate, or dioctylsebacate.

In one or more embodiments, the vulcanizable compositions of this invention may include a tackifier or tackifier resin. As is known in the art, these resins generally increase the tackiness of the composition. Natural or synthetic resins may be employed. In particular embodiments, a nitrile rubber latex is employed as a tackifier. In these or other embodiments, the tackifier may include Koresin (BASF), which is believed to be a resin of acetylene and p-t-butylphenol.

In one or more embodiments, the vulcanizable composition of this invention may include a low viscosity polyethylene wax. Low viscosity polyethylene wax is a release, or antisticking, agent. A useful low viscosity polyethylene wax is available from Akrochem Corporation (Akron, Ohio) under the PE-100 tradename.

In one or more embodiments, the vulcanizable composition of this invention may include a homogenizing agent. Useful homogenizing agents include Strucktol EONS, which is a mixture of aliphatic hydrocarbon resins.

H. Amounts

As is conventional in the art, the rubber component of the composition refers to the elastomer system or elastomeric component of the vulcanizable composition, or in other words, the rubber component includes those polymers that, upon vulcanization, form part of the elastomeric network.

1. Rubber

In one or more embodiments, the vulcanizable compositions employed in practicing the present invention include a sufficient amount of vulcanizable rubber so as to achieve a technologically useful rubber article. In one or more embodiments, the overall vulcanizable composition of matter includes at least 25% by weight, in other embodiments at least 30% by weight, in other embodiments at least 35% by weight, in other embodiments at least 40% by weight, and in other embodiments at least 45% by weight vulcanizable rubber, based upon the total weight of the vulcanizable composition. In these or other embodiments, the overall vulcanizable composition of matter includes less than 99%, in other embodiments less than 90%, and in other embodiments less than 75% by weight vulcanizable rubber, based upon the total weight of the vulcanizable composition.

Advantageously, the present invention provides rubber articles that have reduced polymer content, when compared to conventional articles, said articles having good flame retardancy and also good dynamic and mechanical properties. Thus, in one or more embodiments, the amount of vulcanizable rubber in the vulcanizable compositions is from about 25 to about 40% by weight, based upon the total weight of the vulcanizable composition.

In one or more embodiments, at least 80%, in other embodiments at least 90%, and in other embodiments at least 95% of the rubber component of the vulcanizable composition comprises polychloroprene or polychloroprene copolymers. In one or more embodiments, the balance of the rubber component of the vulcanizable composition comprises natural rubber or a blend of natural rubber and a diene polymer.

2. Halogenated Hydrocarbon

One or more amounts are based upon parts by weight (pbw) per hundred rubber (phr) as a unit of measure. In one or more embodiments, the vulcanizable compositions may include at least 0.2 pbw phr, in other embodiments at least 0.5 pbw, and in other embodiments at least 9 pbw phr halogenated hydrocarbon. In these or other embodiments, the vulcanizable compositions may include less than 25 pbw phr, in other embodiments less than 20 pbw, and in other embodiments less than 15 pbw phr halogenated hydrocarbon. In certain embodiments, the rubber compositions disclosed herein comprise from 0.2 to 25 phr, preferably from 0.5 to 20 phr, or 1 to 15 phr of at least one chlorinated hydrocarbon wax.

In one or more embodiments, the vulcanizable compositions may include at least 0.2 pbw phr, in other embodiments at least 0.5 pbw, and in other embodiments at least 9 pbw phr chlorinated paraffin wax. In these or other embodiments, the vulcanizable compositions may include less than 25 pbw phr, in other embodiments less than 20 pbw, and in other embodiments less than 15 pbw phr chlorinated paraffin wax. In certain embodiments, the rubber compositions disclosed herein comprise from 0.2 to 25 phr, preferably from 0.5 to 20 phr, or 1 to 15 phr of at least one chlorinated hydrocarbon wax.

Accordingly, because suitable chlorinated hydrocarbon waxes that are utilized may contain varying amounts of chlorine, it should be understood that the total amount of chlorination added to the rubber composition can be varied by adjusting the amount (phr) of chlorinated hydrocarbon wax added to the rubber composition and/or the chlorine content of the chlorinated hydrocarbon wax added to the rubber composition. Therefore, the total amount of chlorination added to the rubber composition may vary from 0.005 to 7.5 phr (parts chlorine per hundred parts rubber in the rubber composition). In certain embodiments utilizing chlorinated hydrocarbon wax, the amount of chlorination added to the rubber composition is from 1 to 4 phr.

3. Alumina Trihydrate

In one or more embodiments, the vulcanizable compositions may include 0 pbw, in other embodiments at least 0.1 pbw, and in other embodiments at least 0.5 pbw alumina trihydrate, based on 100 parts by weight rubber (phr). In these or other embodiments, the vulcanizable compositions may include less than 20 pbw, in other embodiments less than 15 pbw, and in other embodiments less than 10 pbw alumina trihydrate phr. In these or other embodiments, the vulcanizable compositions may include from about 0 to about 20 pbw, in other embodiments from about 0.1 to about 15 pbw, and in other embodiments from about 0.5 to about 10 pbw alumina trihydrate, based on 100 parts by weight rubber (phr).

4. Expandable Graphite

In one or more embodiments, the vulcanizable compositions may include at least 0.5 pbw, in other embodiments at least 1 pbw, and in other embodiments at least 5 pbw expandable graphite, based on 100 parts by weight rubber (phr). In these or other embodiments, the vulcanizable compositions may include less than 40 pbw, in other embodiments less than 35 pbw, and in other embodiments less than 30 pbw expandable graphite phr. In these or other embodiments, the vulcanizable compositions may include from about 0.5 to about 40 pbw, in other embodiments from about 1 to about 35 pbw, and in other embodiments from about 5 to about 30 pbw expandable graphite, based on 100 parts by weight rubber (phr).

5. Plasticizer

In certain embodiments, the vulcanizable composition of this invention is devoid of plasticizer. In one or more embodiments, the vulcanizable compositions may include at least 7 pbw, in other embodiments at least 10 pbw, and in other embodiments at least 12 pbw plasticizer, based on 100 parts by weight rubber (phr). In these or other embodiments, the vulcanizable compositions may include less than 100 pbw, in other embodiments less than 90 pbw, and in other embodiments less than 80 pbw plasticizer phr. In these or other embodiments, the vulcanizable compositions may include from about 0 to about 100 pbw, in other embodiments from about 10 to about 90 pbw, and in other embodiments from about 12 to about 80 pbw plasticizer, based on 100 parts by weight rubber (phr).

6. Carbon Black

In one or more embodiments, the vulcanizable composition may include at least about 20, in other embodiments at least about 30, and in other embodiments at least about 40 pbw carbon black phr. In one or more embodiments, the vulcanizable composition may include less than about 100, in other embodiments less than about 75, and in other embodiments less than about 50 pbw carbon black phr.

7. Silica

In one or more embodiments, the vulcanizable composition may include at least 15, in other embodiments at least 20, and in other embodiments at least 25 pbw silica phr. In one or more embodiments the vulcanizable composition may include less than 250, in other embodiments less than 200, in other embodiments less than 90, and in other embodiments less than 80 pbw silica phr. Where both carbon black and silica are employed, the weight ratio of carbon black to silica may range from 9:1 to 0.5:1, in other embodiments from 5:1 to 1:1, and in other embodiments from 4:1 to 2:1.

8. Factice

In certain embodiments, the vulcanizable composition of this invention is devoid of factice. In one or more embodiments, the vulcanizable composition may include at least about 1, in other embodiments at least about 2, and in other embodiments at least about 3 pbw factice phr. In one or more embodiments, the vulcanizable composition may include less than about 10, in other embodiments less than about 8, and in other embodiments less than about 6 pbw factice phr.

9. Tackifier

In certain embodiments, the vulcanizable composition of this invention is devoid of tackifiers. In certain embodiments, the vulcanizable composition of this invention may include at least 1 part by weight, in other embodiments at least 2 parts by weight, in other embodiments at least 4 parts by weight tackifier phr.

In these or other embodiments, the vulcanizable composition may include less than 10 pbw, in other embodiments less than 8 pbw, in other embodiments less than 5 pbw tackifier phr. In these or other embodiments, the vulcanizable compositions may include from about 0 to about 10 pbw, in other embodiments from about 1 to about 8 tackifier phr.

10. Homogenizing Agent

In certain embodiments, the vulcanizable composition of this invention optionally includes at least 1 part by weight homogenizing agent phr, in other embodiments at least 2 parts by weight, in other embodiments at least 4 parts by weight, in other embodiments at least 5 parts by weight, in other embodiments at least 6 parts by weight, in other embodiments at least 7 parts by weight, in other embodiments at least 8 parts by weight, in other embodiments at least 9 parts by weight, and in other embodiments at least 10 parts by weight homogenizing agent phr.

In these or other embodiments, the vulcanizable composition may include less than 20 pbw, in other embodiments less than 18 pbw, in other embodiments less than 16 pbw, in other embodiments less than 14 pbw, and in other embodiments less than 12 pbw homogenizing agent phr.

11. Curatives

Those skilled in the art will be able to select an appropriate amount of the sulfur-based curative and complementary cure agents in order to achieve a desired level of cure. In one or more embodiments, the amount of sulfur is at least 0.1 phr, in other embodiments, at least 0.5 phr. In one or more embodiments, the amount of sulfur is less than 8 phr, in other embodiments, less than 5 phr.

12. Zinc Oxide

In one or more embodiments, the amount of zinc oxide is at least 0.5 phr, in other embodiments, at least 0.75 phr, in other embodiments, at least 1 phr, and in other embodiments, at least 2 phr. In one or more embodiments, the amount of zinc oxide is less than 8 phr, in other embodiments, less than 5 phr, in other embodiments, less than 4 phr, in other embodiments, less than 3 phr, and in other embodiments, less than 2 phr. In one or more embodiments, the amount of zinc oxide is from about 1 to about 3 phr, in other embodiments, the amount of zinc oxide is from about 0.5 to about 2 phr.

13. Antioxidants

In one or more embodiments, the amount of antioxidants is from about 1 to about 5 phr. In one or more embodiments, the amount of antiozonants is from about 1 to about 5 phr. In one or more embodiments, the amount of accelerators is from about 0.1 to about 4 phr.

14. Clay

In one or more embodiments, the vulcanizable composition may include at least about 20, in other embodiments at least about 30, and in other embodiments at least about 40 pbw clay phr. In one or more embodiments, the vulcanizable composition may include less than about 100, in other embodiments less than about 75, and in other embodiments less than about 50 pbw clay phr.

II. METHOD OF PREPARATION

The vulcanizable compositions may be prepared by conventional manufacturing techniques including standard mixing techniques. Cured rubber articles may be prepared by employing conventional rubber shaping, molding and curing techniques. The cured or crosslinked compositions may be referred to as vulcanizates, which generally contain three-dimensional polymeric networks that are thermoset. The other ingredients, such as fillers and processing aids, may be evenly dispersed throughout the crosslinked network. Rubber compounding techniques and the additives employed therein are generally disclosed in *The Compounding and Vulcanization of Rubber*, in *Rubber Technology* ($2^{nd}$ Ed. 1973).

The mixing process may employ conventional rubber compounding equipment such as Brabender, Banbury, Werner-Pfleiderer, Sigma-blade mixer, two-roll mill, or other mixers suitable for forming viscous, relatively uniform admixtures. Mixing techniques depend on a variety of factors such as the specific types of polymers used, and the fillers, processing oils, waxes, and other ingredients used. In one or more embodiments, the ingredients can be added together in a single stage. In other embodiments, some of the ingredients such as polymer, fire retardants, carbon black, etc. can be first loaded followed by the unsaturated polymer. In other embodiments, where unsaturated polymer is employed, the unsaturated polymer may be added first, followed by the other ingredients. In even other embodiments, unsaturated polymer may be added at the same time as one or more of the other ingredients.

Mixing cycles generally range from about 2 to 10 minutes. In certain embodiments, an incremental procedure can be used whereby the polymer and part of the ingredients are added first, and the remaining ingredients are added in additional increments. In one or more embodiments, two-stage mixing can be employed.

When utilizing an internal mixer, the dry or powdery materials such as the carbon black can be added first, followed by the processing aids and finally the polymer to form the masterbatch. The cure package (sulfur, accelerants, antidegradants, etc.) can be added near the end of the mixing cycle and at lower temperatures to prevent premature cross-linking of the polymer. In other embodiments, the cure package can be added to the masterbatch in order to improve dispersion.

Once mixed, the composition can be then formed into a sheet via calendaring or combined with a reinforcing cord (fabric or metal). The compositions of the invention can also be formed into various types of articles using other techniques such as extrusion. The vulcanizable compositions of the present invention can be fabricated into various rubber articles. The vulcanizable compositions of the present invention can employed in one or more layers of various articles that include one or more rubber layers.

III. INDUSTRIAL APPLICABILITY

The rubber articles of the present invention are suitable for many different industries, including without limitation tires, hoses, cables, rubber-coated fabric and articles made therefrom, conveyer belts, geomembranes, roofing materials, and other construction membranes. Rubber hoses, for example, are in wide use for material transfer and fluid power applications.

An example of a tire according to the present invention comprises components including a tread portion, a belt package, a pair of sidewalls, an inner liner, a pair of axially spaced bead portions, and a ply extending between the bead portions. In one or more embodiments, one or more of the tire components include the vulcanizate of a vulcanizable composition that comprises at least one vulcanizable polymer, a curative, a halogenated hydrocarbon wax, and expandable graphite.

Pneumatic tires can be made as discussed in U.S. Pat. Nos. 5,866,171, 5,876,527, 5,931,211, and 5,971,046, all of which are incorporated herein by reference, or as generally known in the art. For example, the various tire components can be prepared as green tire components (i.e., uncured tire components), and assembled into a green tire. The green tire can then be subjected to curing conditions to form a vulcanized tire wherein the various green components are generally adhered to one another through the vulcanization process.

Hose constructions and methods of their manufacture are known in the art as exemplified in U.S. Patent App. Publ. Nos. 2016/0131283 A1, 2016/0130429 A1, 2015/0368448 A1, 2015/0183970 A1, 2014/0329035 A1, and 2007/0173571 A1, all of which are incorporated by reference herein.

In one or more embodiments, cured rubber articles prepared according to the present invention exhibit improved fire protection properties, when compared to rubber articles prepared from compositions that do not contain the synergistic fire protection package that is described herein. In one or more embodiments, articles that include one or more layer that is formed from vulcanizable compositions according to the present invention exhibit improved fire properties, including one or more properties of reduced flame spread, reduced heat release, reduced smoke toxicity, reduced smoke density, and reduced smoke emission.

Embodiments of the articles of the present invention are suitable for use in railway applications, and meet or exceed the requirements for fire behavior for materials and components used in those and other applications. Advantageously, one or more embodiments of rubber articles that are prepared according to the present invention meet or exceed the European Standard EN 45545-2.

Various modifications and alterations that do not depart from the scope and spirit of this invention will become apparent to those skilled in the art. This invention is not to be duly limited to the illustrative embodiments set forth herein.

What is claimed is:

1. A tire component prepared by a process comprising the steps of:
   (i) preparing a vulcanizable composition that includes at least one vulcanizable polymer, a curative, at least one halogenated hydrocarbon wax, and expandable graphite, where the vulcanizable composition comprises from about 0.5 parts by weight to about 40 parts by weight expandable graphite, based upon one hundred parts by weight rubber;
   (ii) fabricating an uncured tire component comprising at least one layer that is formed from said vulcanizable composition; and
   (iii) at least partially curing the uncured tire component to form a cured tire component, wherein the cured tire component is selected from the group consisting of tread, belt, sidewall, ply, bead, and inner liner, where the expandable graphite is not expanded during the said process, or is expanded to at most 100% in volume during the said process.

2. The tire component of claim 1, where the vulcanizable composition further comprises from about 0.1 parts by weight to about 20 parts by weight alumina trihydrate, based upon one hundred parts by weight rubber.

3. The tire component of claim 1, where the vulcanizable composition further comprises from about 20 parts by weight to about 100 parts by weight clay, based upon one hundred parts by weight rubber.

4. The tire component of claim 1, where the vulcanizable composition further comprises carbon black.

5. The tire component of claim 1, where the vulcanizable composition further comprises silica.

6. The tire component of claim 1, where the vulcanizable composition further comprises factice.

7. The tire component of claim 1, where the vulcanizable composition further comprises one or more plasticizers.

8. The tire component of claim 1, where the vulcanizable composition further comprises one or more homogenizing agents.

9. The tire component of claim 1, where the vulcanizable composition further comprises one or more antioxidants.

10. The tire component of claim 1, where the vulcanizable composition further comprises zinc oxide.

11. The tire component of claim 1, where the expandable graphite is characterized by an expansion ratio of at least 10:1.

12. The tire component of claim 1, where the expandable graphite, if expanded, is expanded to at most 50% in volume during the said process.

13. A tire comprising at least one tire component that includes the vulcanizate of a vulcanizable composition that includes:
   (i) a rubber that includes at least one vulcanizable polymer,
   (ii) a curative,
   (iii) a halogenated hydrocarbon wax, and
   (iv) from about 0.5 parts by weight to about 40 parts by weight expandable graphite, based upon one hundred parts by weight rubber, wherein the at least one tire component is selected from the group consisting of tread portion, belt, sidewall, inner liner, bead and ply, and wherein the expandable graphite is not expanded in the tire component, or is expanded to at most 100% in volume in the tire component.

14. The tire of claim 13, where the total amount of vulcanizable polymer in the vulcanizable composition is from about 25 to about 40 wt. %, based upon the total weight of the composition.

15. The tire of claim 13, where the at least one vulcanizable polymer comprises polychloroprene.

16. The tire of claim 13, where the at least one vulcanizable polymer comprises polychloroprene, and where the composition further comprises at least one additional vulcanizable polymer selected from the group consisting of natural rubber, synthetic polyisoprene, polybutadiene, polyisobutylene-co-isoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, nitrile rubber, silicone rubber, epichlorohydrin rubber, and mixtures thereof.

17. The tire of claim 13, where the at least one halogenated hydrocarbon wax is present in an amount of from about 0.2 parts by weight to about 25 parts by weight, based upon one hundred parts by weight rubber.

18. The tire of claim 13, where the vulcanizable composition comprises from about 1 part by weight to about 35 parts by weight expandable graphite, based upon one hundred parts by weight rubber.

19. The tire of claim 13, where the vulcanizable composition further comprises from about 0.1 parts by weight to about 20 parts by weight alumina trihydrate, based upon one hundred parts by weight rubber.

20. The tire of claim 13, where the vulcanizable composition further comprises from about 20 parts by weight to about 100 parts by weight clay, based upon one hundred parts by weight rubber.

21. A tire component prepared by a process comprising the steps of:
   (i) preparing a vulcanizable composition that includes at least one vulcanizable polymer, a curative, at least one halogenated hydrocarbon wax, and expandable graphite, where the vulcanizable composition comprises from about 0.5 parts by weight to about 40 parts by weight expandable graphite, based upon one hundred parts by weight rubber;
   (ii) fabricating an uncured tire component comprising at least one layer that is formed from said vulcanizable composition; and
   (iii) at least partially curing the uncured tire component to form a cured tire component wherein the cured tire component is selected from the group consisting of tread, belt sidewall, ply, bead, and inner liner, and where the expandable graphite is intercalated with one or more intercalants selected from the group consisting of halogens, alkali metals, sulfates, nitrates, organic acids, aluminum chlorides, ferric chlorides, metal halides, arsenic sulfides, and thallium sulfides.

* * * * *